United States Patent
Miyoshi et al.

(10) Patent No.: US 12,528,924 B2
(45) Date of Patent: Jan. 20, 2026

(54) REINFORCING-FIBER COMPOSITE MATERIAL

(71) Applicant: Toray Industries, Inc., Tokyo (JP)

(72) Inventors: Katsuhiro Miyoshi, Nagoya (JP); Tadashi Watanabe, Nagoya (JP); Yasukazu Ono, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 825 days.

(21) Appl. No.: 17/800,922

(22) PCT Filed: Mar. 1, 2021

(86) PCT No.: PCT/JP2021/007642
§ 371 (c)(1),
(2) Date: Aug. 19, 2022

(87) PCT Pub. No.: WO2021/177215
PCT Pub. Date: Sep. 10, 2021

(65) Prior Publication Data
US 2023/0077555 A1 Mar. 16, 2023

(30) Foreign Application Priority Data
Mar. 2, 2020 (JP) .................. 2020-034762

(51) Int. Cl.
*C08J 5/24* (2006.01)
*B29B 11/16* (2006.01)

(52) U.S. Cl.
CPC .............. *C08J 5/243* (2021.05); *B29B 11/16* (2013.01); *C08J 2333/04* (2013.01)

(58) Field of Classification Search
CPC .... C08J 2363/10; C08J 2333/04; C08J 5/243; C08J 5/042; B29B 11/16; B29B 15/122;
(Continued)

(56) References Cited

U.S. PATENT DOCUMENTS

| | | | |
|---|---|---|---|
| 2010/0178495 A1 | 7/2010 | Taketa et al. | |
| 2017/0305074 A1 | 10/2017 | Miyoshi et al. | |

(Continued)

FOREIGN PATENT DOCUMENTS

| | | | |
|---|---|---|---|
| JP | 2009-062474 A | 3/2009 | |
| WO | 2008/149615 A1 | 12/2008 | |

(Continued)

OTHER PUBLICATIONS

International Search Report dated Apr. 20, 2021 in counterpart International Application No. PCT/JP2021/007642.

(Continued)

*Primary Examiner* — Camie S Thompson
(74) *Attorney, Agent, or Firm* — DLA Piper LLP (US)

(57) ABSTRACT

A reinforcing-fiber composite material includes not less than 20 wt % but less than 70 wt % of discontinuous reinforcing fibers, and a matrix resin, wherein at least a portion of the discontinuous reinforcing fibers forms a fiber aggregation, and at least one bundle of the fiber aggregation has a surface that, when projected onto a two-dimensional plane, has at least one region where the number of monofilaments constituting the aggregation is reduced, at opposite ends in a longitudinal direction of a minimum circumscribed rectangle of the projected surface, and at portions other than the opposite ends.

8 Claims, 6 Drawing Sheets

(58) Field of Classification Search
CPC .. B29C 70/12; B29K 2105/12; B29K 2307/04
USPC ............................................................ 442/60
See application file for complete search history.

(56) References Cited

U.S. PATENT DOCUMENTS

| | | |
|---|---|---|
| 2019/0054707 A1 | 2/2019 | Miyoshi et al. |
| 2019/0352474 A1 | 11/2019 | Fuse et al. |
| 2022/0049061 A1 | 2/2022 | Ono et al. |

FOREIGN PATENT DOCUMENTS

| | | |
|---|---|---|
| WO | 2016/047412 A1 | 3/2016 |
| WO | 2017/145884 A1 | 8/2017 |
| WO | 2018/143067 A1 | 8/2018 |
| WO | 2020/067058 | 4/2020 |

OTHER PUBLICATIONS

Written Opinion dated Apr. 20, 2021 in counterpart International Application No. PCT/JP2021/007642.

REINFORCING-FIBER COMPOSITE MATERIAL

TECHNICAL FIELD

This disclosure relates to a fiber reinforced composite material that contains discontinuous reinforcing fibers and a matrix resin.

BACKGROUND

Having good mechanical properties, fiber reinforced composite materials containing reinforcing fibers and matrix resin are used in the production of various molded products and their demand is increasing year by year in various fields.

In particular, fiber reinforced composite materials having high functional properties contain carbon fiber as the reinforcing fiber. In the most widely used process for producing carbon fiber composite materials, sheets of prepreg, which is an intermediate base material in a semi-cured state composed mainly of continuous carbon fibers impregnated with a matrix resin, are stacked and heated under pressure to cure the matrix resin in a high-temperature, high-pressure container to produce a continuous fiber reinforced composite material. This is called the autoclave molding method. Another molding method that is in use in recent years to achieve higher production efficiency is the RTM (resin transfer molding) method, in which a continuous reinforcing fiber base is shaped to the intended member first, followed by impregnating it with a matrix resin and then curing the resin. Carbon fiber composite materials produced by these molding methods have excellent mechanical properties because they contain continuous fibers. In addition, the continuous fibers are aligned regularly, and therefore, a material having required mechanical properties can be designed by placing base members appropriately. The resulting material will vary little in mechanical properties. Because of being continuous, however, these fibers are difficult to process into complicated shapes such as three-dimensional ones, and therefore, their application is limited mainly to members having nearly planar shapes.

Molding methods suitable for complicated shapes such as three-dimensional ones include SMC (sheet molding compound) molding and stampable sheet molding. To produce a molded SMC product, strands of reinforcing fibers are cut in the perpendicular direction to the fibers to prepare chopped strands with a fiber length of, for example, about 25 mm, and then impregnated with a matrix resin, which is a thermosetting resin, to provide a sheet-like base material (SMC) in a semi-cured state, followed by heating it under pressure. To produce a molded stampable sheet product, a nonwoven fabric mat or the like made of chopped strands cut to about 25 mm or discontinuous reinforcing fibers is impregnated with a thermoplastic resin to prepare a sheet-like base material (stampable sheet), and it is once heated with an infrared heater or the like to a temperature not lower than the melting point of the thermoplastic resin and then cooled under pressure in a mold maintained at a predetermined temperature.

In many instances, an SMC sheet or a stampable sheet is cut before pressing to a size smaller than that of the intended molded product and put on a mold, and then pressure is applied to expand it (cause it to flow) to a desired shape to produce a molded product. Accordingly, this flowing allows the sheet to accurately form a complicated shape such as a three-dimensional one. For the SMC and stampable sheet, however, an irregular distribution of chopped strands and irregular orientation in a nonwoven fabric mat occur inevitably in the sheet production step, leading to a molded product having poor mechanical properties or a large variation in them. Furthermore, such irregular distribution and irregular orientation tend to lead to warp, surface sinks and the like, particularly in thin molded members.

To make up for the defects of materials as described above, International Publication WO 2008/149615, for example, proposes a chopped fiber bundle that has regions each starting from either end in the fiber orientation direction in the chopped fiber bundle and in which the number of reinforcing fibers increases in the orientation direction of the reinforcing fibers toward the center of the chopped fiber bundle and also proposes a molding material.

In addition, International Publication WO 2017/145884 proposes a discontinuous fiber reinforced composite material that includes discontinuous fiber bundles with different lengths characterized in that, when projected onto a two-dimensional plane, longer discontinuous fiber bundles have acuter apex angle at the ends of the discontinuous reinforcing fiber bundles.

For composite materials including discontinuous reinforcing fibers, entry of discontinuous reinforcing fibers into the matrix resin generally leads to a decrease in fluidity of the composite material during molding, but such a decrease in fluidity can be suppressed by increasing the content of discontinuous reinforcing fibers that are in the form of aggregates of discontinuous reinforcing fibers. However, in a fiber reinforced composite material produced from discontinuous reinforcing fiber bundles that give strip-like shapes when projected onto a two-dimensional plane, structural defects that work as starting points of fracture can be formed easily in portions where fiber bundles overlap each other or in portions located around the ends of fiber bundles, possibly leading to inferior mechanical properties.

Furthermore, with an increasing length of discontinuous reinforcing fibers, the resulting fiber reinforced composite material will have better mechanical properties but suffer a larger decrease in fluidity due to increased entanglement of fibers. On the contrary, with a decreasing length of discontinuous reinforcing fibers, the resulting fiber reinforced composite material tends to have a higher fluidity but suffer a larger deterioration in mechanical properties. Therefore, the optimum form of fiber reinforced composite material that emphasizes high fluidity does not necessarily agree with the optimum form of fiber reinforced composite material that emphasizes mechanical properties.

Furthermore, with a decreasing length of discontinuous reinforcing fibers, the resulting fiber reinforced composite material will have a higher fluidity, but in the production process for a sheet-like base material such as SMC and stampable sheet, which serve as precursors for discontinuous fiber reinforced composite materials, it will lead to a discontinuous fiber reinforced composite material with a larger anisotropy and variation in mechanical properties because the binding force between discontinuous reinforcing fibers is so weak that the flowing resin causes unintentional flows of the discontinuous reinforcing fibers during the impregnation of the sheet-like molding material with a matrix resin under pressure.

As proposed in WO '615 described above, sufficient study is not made regarding the use of chopped fiber bundles having a desired length distribution or regarding the central portion, excluding both ends, of the chopped fiber bundles.

In addition, as proposed in WO '884 described above, sufficient study is not made regarding the length of the discontinuous fiber bundles or suitable ranges of its distribution or regarding the central portion, excluding both ends, of the discontinuous reinforcing fiber bundles.

Thus, it could be helpful to provide an excellent fiber reinforced composite material that can achieve both high fluidity during molding and good mechanical properties at a high level, which cannot be achieved by the conventional fiber reinforced composite materials composed mainly of discontinuous reinforcing fibers and a matrix resin, that can suppress the flows of the discontinuous reinforcing fibers caused by flowing resin during the impregnation of the sheet-like molding material with a matrix resin under pressure in the production process for a sheet-like base material such as SMC and stampable sheet, which are precursors for the discontinuous fiber reinforced composite material, and also that has well-balanced mechanical properties.

SUMMARY

We thus provide:

[1] A discontinuous fiber reinforced composite material including discontinuous reinforcing fibers accounting for 20 wt % or more and less than 70 wt % and a matrix resin, wherein at least part of the discontinuous reinforcing fibers form fiber aggregates and also wherein at least one of the fiber aggregates is such that, when a face thereof is projected onto a two-dimensional plane, the length-directional end portions of the minimum circumscribed rectangle about the projected face and the portion other than the two end portions each contain at least one region in which the number of filaments belonging to that fiber aggregate decreases (bow-shaped discontinuous reinforcing fiber aggregate (A)).

[2] A discontinuous fiber reinforced composite material as set forth in [1], wherein 2 wt % or more and 15 wt % or less of all discontinuous reinforcing fibers form discontinuous reinforcing fiber aggregates (1), where a discontinuous reinforcing fiber aggregate (1) is one of the reinforcing fiber aggregates that gives a minimum circumscribed rectangle having a long side length of 30 mm or more.

[3] A discontinuous fiber reinforced composite material as set forth in [2], wherein at least one of the discontinuous reinforcing fiber aggregates (1) is a bow-shaped discontinuous reinforcing fiber aggregate (A).

[4] A discontinuous fiber reinforced composite material as set forth in any one of [1] to [3], wherein the ratio of "the number average of the long side length of minimum circumscribed rectangle: the number average of fiber length" in the discontinuous reinforcing fiber aggregates (2) is "1.5:1.0" to "2.0:1.0," where a discontinuous reinforcing fiber aggregate (2) is the fiber aggregates that gives a minimum circumscribed rectangle having a long side length of less than 30 mm.

[5] A discontinuous fiber reinforced composite material as set forth in any one of [2] to [4], wherein the discontinuous reinforcing fiber aggregates (1) are such that, when a face of each of them is projected onto a two-dimensional plane, the number average of the acute angle located at the length-directional end and measured to the length direction of the projected face is 5° or more and 30° or less.

[6] A discontinuous fiber reinforced composite material as set forth in [4] or [5], wherein the discontinuous reinforcing fiber aggregates (2) are such that, when a face of each of them is projected onto a two-dimensional plane, the number average of the acute angle located at the length-directional end and measured to the length direction of the projected face is 5° or more and 30° or less.

[7] A discontinuous fiber reinforced composite material as set forth in any one of [1] to [6], wherein the number average of obtuse angle between the length direction of the minimum circumscribed rectangle of the projected face of each bow-shaped discontinuous reinforcing fiber aggregate (A) and the gradients of the region that are located outside the end portions and in which the number of filaments decreases is 135° or more and 175° or less.

[8] A discontinuous fiber reinforced composite material as set forth in any one of [1] to [7], wherein the discontinuous reinforcing fibers have a number average of fiber length of 3 mm or more and less than 100 mm.

As described above, we can provide an excellent composite material containing discontinuous fibers that shows high fluidity during molding that produces a molded product with good mechanical properties and high two-dimensional isotropy, and suffers little variation in such mechanical properties.

BRIEF DESCRIPTION OF THE DRAWINGS

FIG. 1(1) shows an example of a bow-shaped discontinuous reinforcing fiber aggregate (A).

FIG. 1(2) shows examples of the apex angles θ and the obtuse angles α of a bow-shaped discontinuous reinforcing fiber aggregate (A).

FIG. 1(3) shows an example of the minimum circumscribed rectangle of a bow-shaped discontinuous reinforcing fiber aggregate (A).

FIGS. 2(1)-(7) show typical shapes formed when a bow-shaped discontinuous reinforcing fiber aggregate (A) is projected onto a two-dimension plane.

FIG. 4(1) shows a typical disk blade type cutting machine.

FIG. 4(2) shows a fiber aggregate being cut by a disk blade type cutting machine.

FIG. 5(1) shows an example of a non-bow-shaped discontinuous reinforcing fiber aggregate (2).

FIG. 5(2) shows a typical method to measure the apex angle θ of a discontinuous reinforcing fiber aggregate (2).

FIG. 6(1) shows a typical bow-shaped discontinuous reinforcing fiber aggregate (A).

FIG. 6(2) shows a typical method to measure the angle α of a bow-shaped discontinuous reinforcing fiber aggregate (A).

EXPLANATION OF NUMERALS

1 A typical form of bow-shaped discontinuous reinforcing fiber aggregate (A)
2 A typical minimum circumscribed rectangle of bow-shaped discontinuous reinforcing fiber aggregate (A)
L A typical long side length of minimum circumscribed rectangle
W A typical short side length of minimum circumscribed rectangle
$\theta_1$, $\theta_2$ Typical acute apex angles of discontinuous reinforcing fiber aggregate
$\alpha_1$, $\alpha_2$ Typical obtuse angles of discontinuous reinforcing fiber aggregate
11 A typical first sheet roll
12 A typical conveyor
13 A typical first resin bath
14 A typical first resin sheet coated with paste of matrix resin to predetermined thickness 15 A typical second sheet roll
16 A typical second resin bath
17 A typical second resin sheet coated with paste of matrix resin to predetermined thickness
21 A typical bobbin of reinforced fiber strand
22 A typical continuous reinforcing fiber strand
23 A typical cutting machine
24 A typical distributing machine (distributor)
31 Typical aggregates of discontinuous reinforcing fibers randomly scattered on first resin sheet
32 Aggregates partially impregnated with matrix resin spread over first resin sheet and second resin sheet
33 A typical pressing machine
34 A typical molding material intended as precursor for discontinuous fiber reinforced composite material
40 A typical cutter roller surface of disk blade type cutting machine
41 A typical cutter roller for disk blade type cutting machine
42 A typical disk blade
50 A typical nip roll for disk blade type cutting machine
51 A typical traverse guide for disk blade type cutting machine
60 A typical discontinuous reinforcing fiber aggregate produced by disk blade type cutting machine
70 A typical discontinuous reinforcing fiber aggregate (2)
l1, l2 A typical fiber length of discontinuous reinforcing fiber aggregate.

DETAILED DESCRIPTION

Our materials are described in detail below with reference to Examples and Comparative Examples.

Discontinuous reinforcing fibers account for 20 wt % or more and less than 70 wt % of the fiber reinforced composite material according thereto. The content is more preferably 30 wt % or more and 65 wt % or less, and still more preferably 40 wt % or more and 60 wt % or less. The discontinuous reinforcing fibers account for 20 wt % or more of the composite material to develop good mechanical properties, whereas they account for less than 70 wt % to develop high fluidity and moldability. If the discontinuous reinforcing fibers account for 70 wt % or more, not only the fluidity and moldability will deteriorate, but also the resulting fiber reinforced composite material tends to contain defects such as voids.

Discontinuous reinforcing fibers form fiber aggregates. However, it is not necessary for all discontinuous reinforcing fibers to be included in such fiber aggregates. At least one of the fiber aggregates is characterized in that, when a face thereof is projected onto a two-dimensional plane, the length-directional end portions of the minimum circumscribed rectangle about the projected face and the portion other than the two end portions each contain at least one region in which the number of filaments belonging to that fiber aggregate decreases (occasionally a region in which the number of filaments decreases). In both end portions of the fiber aggregate, the number of fibers decreases toward the ends, and there is one or more regions outside the end portions in which the number of fibers decreases toward the center from the ends. Such a fiber aggregate is referred to as a bow-shaped discontinuous reinforcing fiber aggregate (A). It is preferable for the fiber aggregate to have such a bow-like shape because in that instance, the thickness of the fiber bundle will be small in a region where the number of filaments decreases and also because structural defects that work as starting points of fracture will not be formed easily in portions located around the ends of discontinuous fiber bundles or in portions where discontinuous fiber bundles overlap each other.

When a face of a bow-shaped discontinuous reinforcing fiber aggregate (A) is projected onto a two-dimensional plane, the projected face preferably has one of the shapes shown in FIGS. 2(1)-(7) or a combination of these shapes. It is preferable for a bow-shaped discontinuous reinforcing fiber aggregate (A) to have such a shape because in that instance, structural defects will not be formed easily in portions located around the ends of discontinuous fiber bundles or in portions where discontinuous fiber bundles overlap each other.

It is not necessary for all discontinuous reinforcing fibers to form bow-shaped discontinuous reinforcing fiber aggregates (A), and they may include, in addition to the latter, discontinuous reinforcing fibers opened down to the filament level resulting from the process for producing discontinuous reinforcing fiber sheets, chopped strands directly formed by cutting strands, separated chopped strands formed by separating chopped strands in the width direction, chopped strands failing to have a characteristic shape of a bow-shaped discontinuous reinforcing fiber aggregate (A), widened chopped strands formed by widening whole chopped strands, and widened and separated strands formed by widening and separating whole chopped strands.

2 wt % or more and 15 wt % or less of all discontinuous reinforcing fibers are preferably accounted for by discontinuous reinforcing fiber aggregates (1) each having a face that gives a minimum circumscribed rectangle with a long side length of 30 mm or more when projected onto a two-dimensional plane. If discontinuous reinforcing fiber aggregates (1) account for 2 wt % or more, it serves, in the production process for a sheet-like molding material such as SMC and stampable sheet, which are precursors for discontinuous fiber reinforced composite materials, to increase the binding force between discontinuous reinforcing fibers during the impregnation of a sheet-like molding material with a matrix resin under pressure. This acts to suppress unintentional flows of the discontinuous reinforcing fibers that may be caused by flowing resin and serves to produce a discontinuous fiber reinforced composite material having a decreased anisotropy or variation in mechanical properties. It is preferable for the discontinuous reinforcing fiber aggregates (1) to account for 15 wt % or less because it serves to produce a discontinuous fiber reinforced composite material that does not suffer a significant decrease in fluidity.

The discontinuous reinforcing fiber aggregates (1) preferably contain at least one bow-shaped discontinuous reinforcing fiber aggregate (A). When projected onto a two-dimensional plane, a discontinuous reinforcing fiber aggregate (1) gives a minimum circumscribed rectangle with a relatively large long side length and this may allow structural defects that work as starting points of fracture to be formed in portions located around the ends of discontinuous fiber bundles or in portions where discontinuous fiber bundles overlap each other. However, it is more likely that the inclusion of at least one bow-shaped one in the discontinuous reinforcing fiber aggregates (1) suppresses the formation of structural defects that work as starting points of fracture.

To suppress formation of structural defects that work as starting points of fracture, it is more preferable for bow-shaped discontinuous reinforcing fiber aggregates (A) to account for 1 wt % or more and 15 wt % or less of all discontinuous reinforcing fibers.

It is preferable that the discontinuous reinforcing fiber aggregates contained in the discontinuous reinforcing fibers include those discontinuous reinforcing fiber aggregates (2) that each give a minimum circumscribed rectangle with a long side length of less than 30 mm when projected onto a two-dimensional plane and give a ratio of the number average of the long side length of minimum circumscribed rectangle to the number average of fiber length of 1.5:1.0 to 2.0:1.0. The number average of the long side length of minimum circumscribed rectangle is preferably not less than 1.5 times the number average of fiber length because it serves to suppress the formation of structural defects that work as starting points of fracture in portions located around the ends of discontinuous reinforcing fiber bundles. The number average of the long side length of minimum circumscribed rectangle is preferably not more than 2.0 times the number average of fiber length because it serves to produce a discontinuous fiber reinforced composite material that does not suffer a significant decrease in fluidity.

For both the discontinuous reinforcing fiber aggregates (1) and (2) projected onto a two-dimensional plane, the number average of the acute angle θ to the length direction in each end portion is preferably 5° or more and 30° or less. If the number average of the acute angle θ in each end portion is 5° or more, it serves to produce a discontinuous fiber reinforced composite material that does not suffer a significant decrease in fluidity. The number average of the acute angle θ is preferably 30° or less because it serves to suppress the formation of structural defects that work as starting points of fracture in portions located around the ends of discontinuous reinforcing fiber bundles.

For a bow-shaped discontinuous reinforcing fiber aggregate (A) projected onto a two-dimensional plane, the obtuse angle α between the length direction of the minimum circumscribed rectangle on the plane of projection and each slope of the region in which the number of filaments existing outside the end portions decreases is preferably 135° or more and 175° or less. The number average of the obtuse angle α is preferably 135° or more and 175° or less because the total fiber bundle thickness in a portion where discontinuous reinforcing fiber bundles overlap each other tends to be smaller and the formation of structural defects that work as starting points of fracture is suppressed.

The number average of fiber length of the discontinuous reinforcing fibers is preferably 3 mm or more and less than 100 mm. A number average of fiber length in the range of 3 mm or more and less than 100 mm is preferable because it serves to achieve high flowability and good mechanical characteristics in a good balance.

Useful reinforcing fibers include organic fibers such as aramid fiber, polyethylene fiber, and poly(paraphenylene benzoxazole) (PBO) fiber; inorganic fibers such as glass fiber, carbon fiber, silicon carbide fiber, alumina fiber, Tyranno fiber, basalt fiber, and ceramics fiber; metal fibers such as stainless steel fiber and steel fiber; and bundles of other reinforcing fibers such as boron fiber, natural fiber, and modified natural fiber. Among others, the use of carbon fiber (polyacrylonitrile (PAN) based carbon fiber in particular) is preferable because it is lightweight compared with other reinforcing fibers, and furthermore, it has good properties including high specific strength and high specific modulus and are also high in heat resistance and chemical resistance.

There are no specific limitations on the type of carbon fiber to use, but useful ones include high-strength, high elastic modulus carbon fiber materials, and they may be used singly or as a combination of two or more thereof. In particular, good examples include PAN based, pitch based, and rayon based carbon fiber materials. The use of a PAN based carbon fiber material is preferable from the viewpoint of the balance between the strength and elastic modulus of the molded products to be produced. The carbon fiber to use preferably has a density of 1.65 to 1.95 g/cm$^3$, more preferably 1.70 to 1.85 g/cm$^3$. The use of a carbon fiber material having an excessively high density leads to a carbon fiber composite material that is inferior in lightness whereas the use of one having an excessively low density is likely to result in a carbon fiber composite material that has inferior mechanical properties.

Furthermore, the carbon fiber is preferably in the form of a carbon fiber strand composed of bundled filaments from the viewpoint of productivity, and it is more preferable for such a carbon fiber strand to contain a large number of filaments. When a carbon fiber strand is used, the number of filaments contained is preferably 1,000 to 100,000, and particularly preferably 10,000 to 70,000. If required, the carbon fiber to use may be in the form of separated carbon fiber strands prepared by separating a carbon fiber strand to a desired strand number using a slitter for strand separation or the like or in the form of a partially separated carbon fiber strand, which is prepared by partially separating a strand cut to an appropriate length. The use of strands separated to a desired strand number can be proposed as a preferred method because, as compared with an unprocessed strand, they serve to produce a carbon fiber composite material that has higher uniformity and better mechanical properties.

A partial fiber separating step consists of widening and partial separation of fibers, and useful widening techniques include, for example, the vibration-widening technique in which reinforcing fiber strands are passed on a vibrating roller so that fiber bundles are widened in the width direction by heating, rubbing, vibration and the like, using a fiber opening bar and the air-widening technique in which compressed air is blown against reinforcing fiber bundles. In regard to the increased width of the reinforcing fiber strand, the widening ratio is preferably 300% to 1,200%.

In the partial fiber separating step, for example, while a widened reinforcing fiber strand prepared by performing the widening technique described above is fed so that it travels in the length direction (fiber traveling direction), a rotating fiber separating tool (for example, a steel plate for fiber separation) provided with a plurality of protrusions is stuck into the widened reinforcing fiber strand to produce a fiber separated portion and also form an entangling region in which filaments are entangled at points of contact with the protrusions in at least one fiber separated region. In a preferred process, the fiber separating tool is subsequently taken out of the widened reinforcing fiber strand and, after undergoing the entanglement accumulation portion that includes entanglement portions, the fiber separating tool is stuck again into the widened reinforcing fiber strands.

A thermoplastic resin and/or a thermosetting resin are used as matrix resin. The thermoplastic resin to use is not particularly limited, and an appropriately selected one can be adopted unless its use leads to a molded product having significantly deteriorated mechanical properties. Useful ones include, for example, polyolefin based resins such as polyethylene resin and polypropylene resin; polyamide based resins such as nylon 6 resin and nylon 6,6 resin; polyester based resins such as polyethylene terephthalate resin and polybutylene terephthalate resin; and others such as polyphenylene sulfide resin, polyether ketone resin, polyethersulfone resin, and aromatic polyamide resin. In particular, it is preferable to use any of polyamide resin, polypropylene resin, and polyphenylene sulfide resin.

The thermosetting to use is not particularly limited either, and an appropriately selected one can be adopted unless its use leads to a molded product having significantly deteriorated mechanical properties. Useful ones include, for example, epoxy resin, unsaturated polyester resin, vinyl ester resin, phenol resin, epoxy acrylate resin, urethane acrylate resin, phenoxy resin, alkyd resin, urethane resin, maleimide resin, and cyanate resin. Of these, preferable ones include epoxy resin, unsaturated polyester resin, vinyl ester resin, phenol resin, and mixtures thereof. When using a mixture of thermosetting resins, the thermosetting resins to be mixed preferably have compatibility with each other or have a high affinity with each other.

There are no specific limitations on the viscosity of the thermosetting resins, but they preferably have resin viscosities of 100 to 100,000 mPa·s.

The matrix resin may contain various additives in addition to a thermoplastic resin and/or a thermosetting resin to suit particular purposes as long as they serve to achieve the desired object.

Useful ones include, for example, fillers such as mica, talc, kaolin, hydrotalcite, sericite, bentonite, xonotlite, sepiolite, smectite, montmorillonite, wollastonite, silica, calcium carbonate, glass bead, glass flake, glass microballoon, clay, molybdenum disulfide, titanium oxide, zinc oxide, antimony oxide, polycalcium phosphate, graphite, barium sulfate, magnesium sulfate, zinc borate, calcium borate, aluminum borate whisker, potassium titanate whisker, and polymer compounds;

conductivity-imparting agents such as metal based agents, metal oxide based agents, carbon black, and graphite powder;

halogen based flame retardants such as brominated resin; antimony based flame retardants such as antimony trioxide and antimony pentoxide; phosphorous based flame retardants such as ammonium polyphosphate, aromatic phosphate, and red phosphorus; organic acid metal salt based flame retardants such as organic metal borate, metal carboxylate, and aromatic sulfonimide metal salt; inorganic flame retardants such as zinc borate, zinc, zinc oxide, and zirconium compounds; nitrogen based flame retardants such as cyanuric acid, isocyanuric acid, melamine, melamine cyanurate, melamine phosphate, and nitrogenized guanidine; fluorine based flame retardants such as PTFE; silicone based flame retardants such as polyorganosiloxane; metal hydroxide based flame retardants such as aluminum hydroxide and magnesium hydroxide; other flame retardants;

flame retardation assistants such as cadmium oxide, zinc oxide, cuprous oxide, cupric oxide, ferrous oxide, ferric oxide, cobalt oxide, manganese oxide, molybdenum oxide, tin oxide, and titanium oxide; crystal nucleating agents such as pigment, dye, lubricant, mold releasing agent, compatibilizer, dispersing agent, mica, talc, and kaolin; plasticizers such as phosphate; and others such as thermal stabilizer, antioxidant, anticoloring agent, ultraviolet absorber, flowability improving agent, foaming agent, antibacterial agent, vibration damping agent, deodorant, slidability improving agent, and antistatic agent such as polyether ester amide.

When a thermosetting resin is used as matrix resin, additives such as shrinkage diminishing agent may also be included as long as it serves to achieve the desired object.

Figure 1:
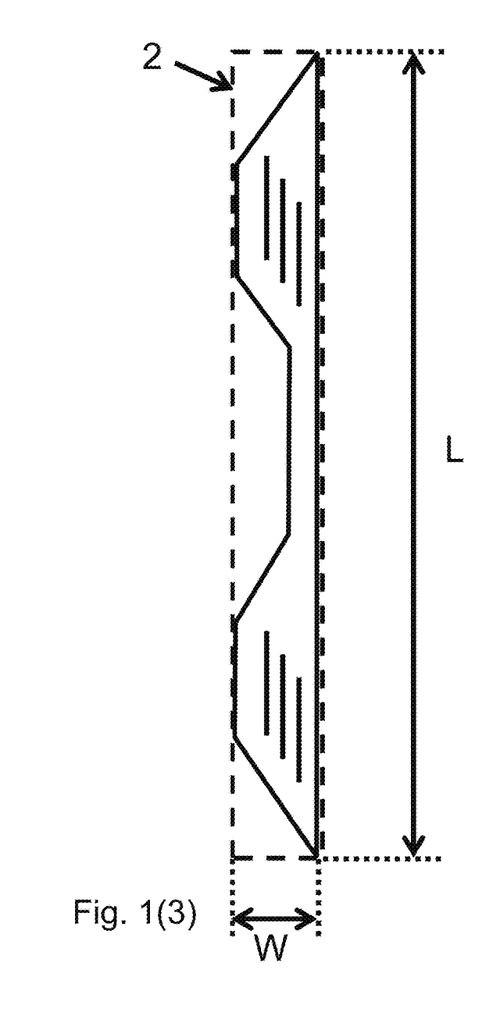
Figure 2:
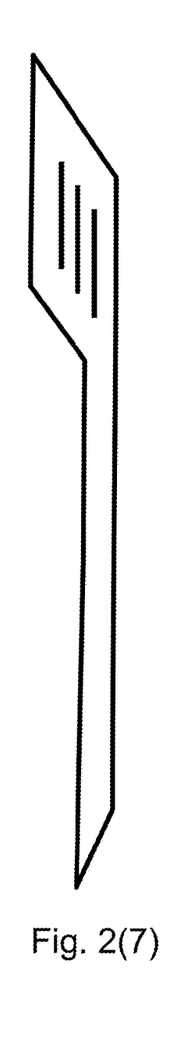
Figure 3:
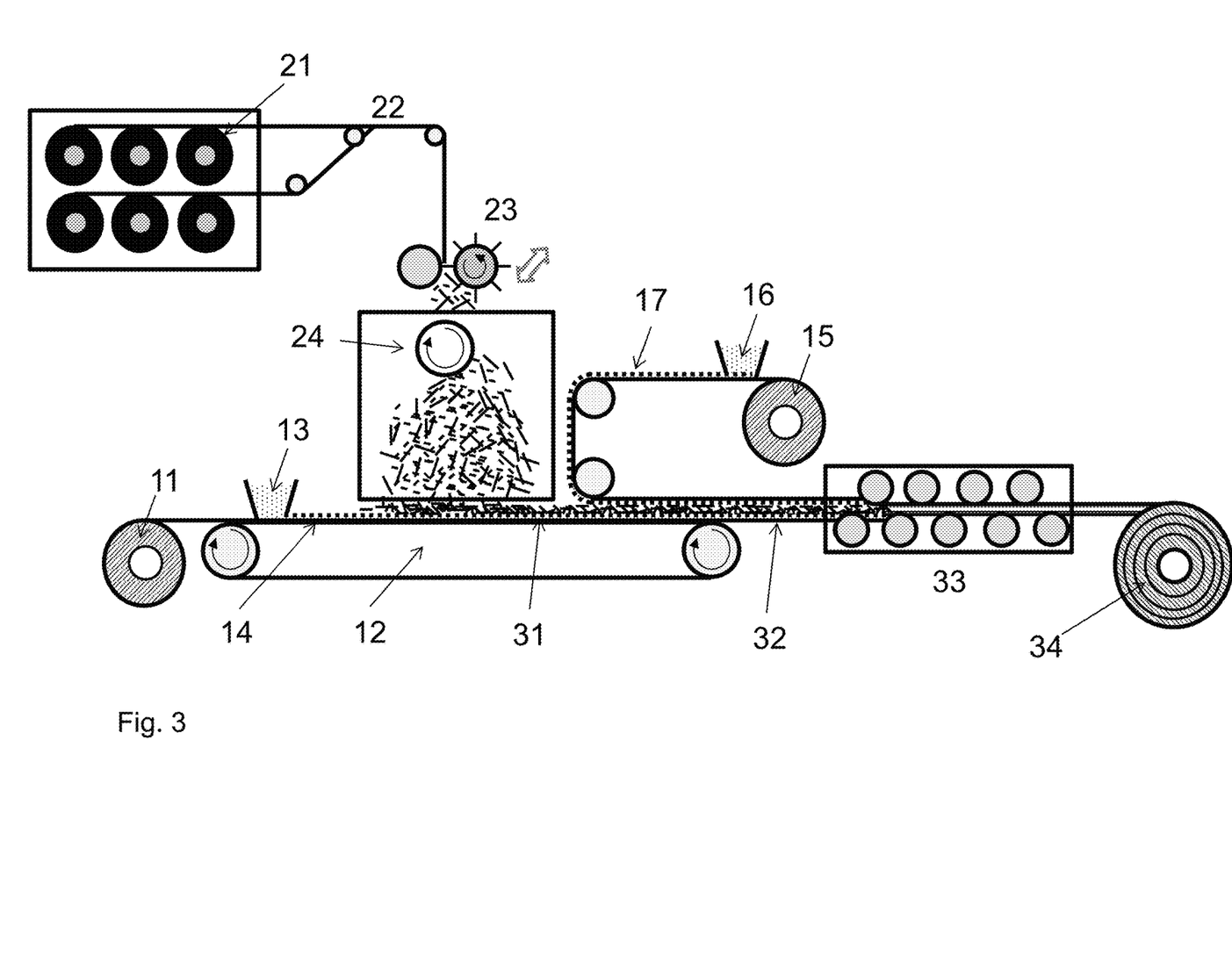
FIG. 3 shows a typical process of preparing a molding material that serves as a precursor for a discontinuous fiber reinforced composite material.
Figure 4:
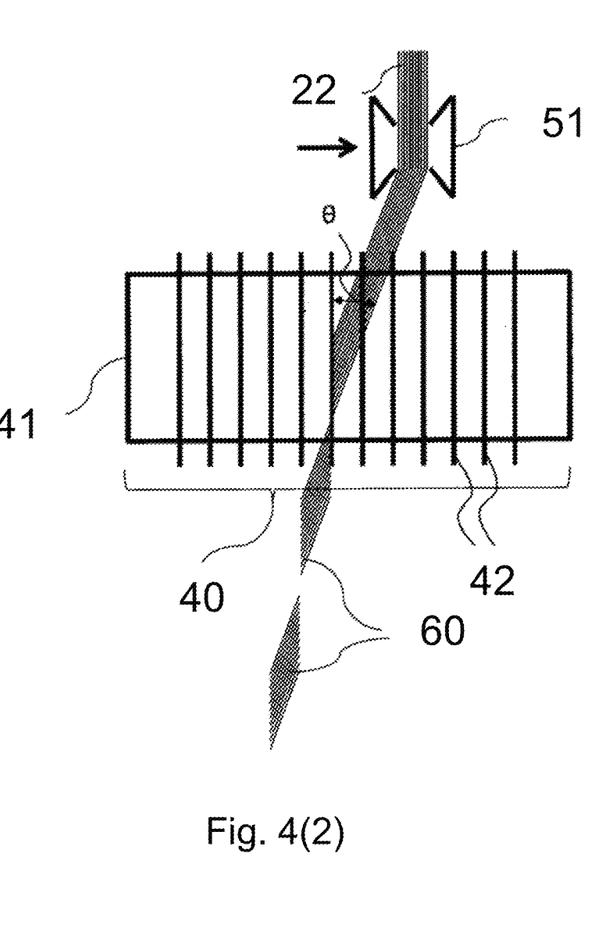
Figure 5:
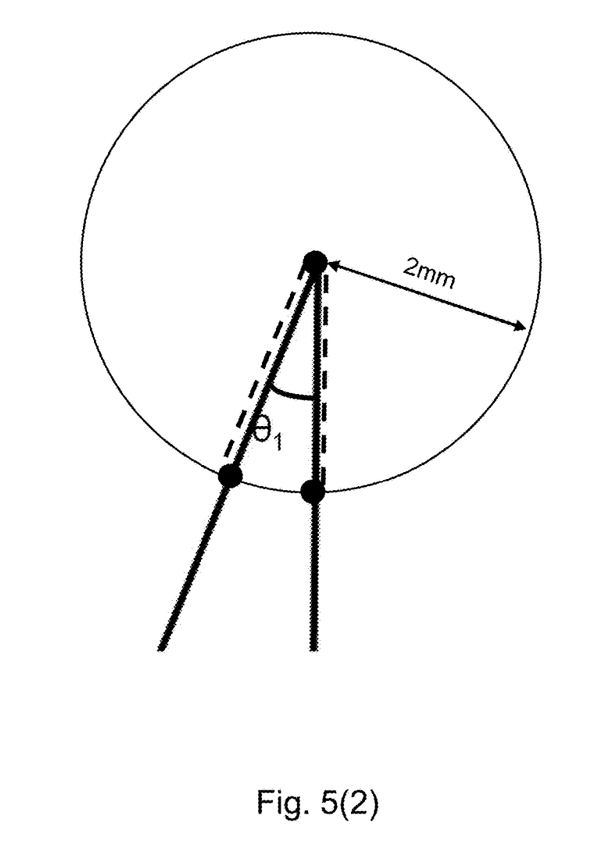
Figure 6:
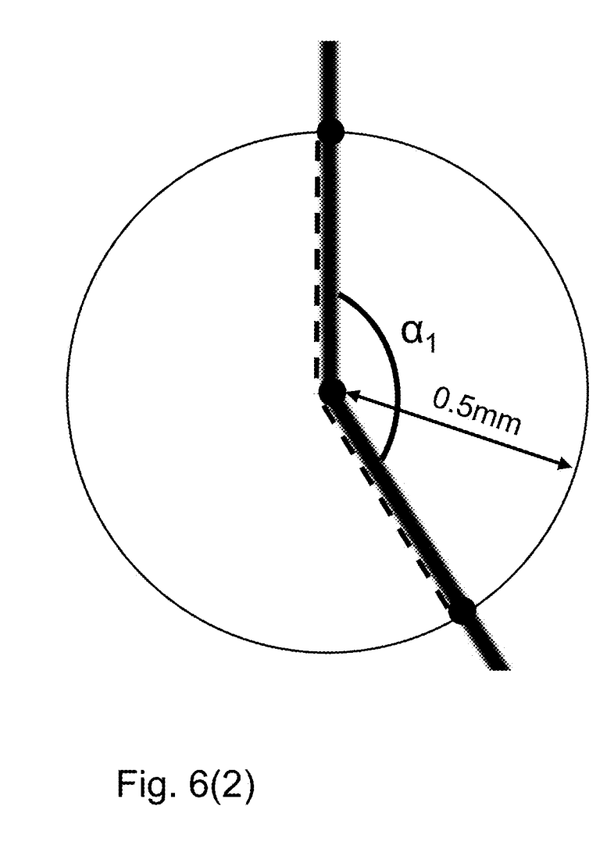

There are no specific limitations on the step of preparing a molding compound that serves as a precursor for the fiber reinforced composite material as long as it serves to achieve the desired object. In an SMC, for example, as shown in FIG. 3, the first carrier sheet is pulled out from the first sheet roll 11 and supplied to the conveyor 12, while paste of the matrix resin is supplied from the first resin bath 13 and spread by a doctor blade to a predetermined thickness to form the first resin sheet 14. The first resin sheet 14 is carried by the conveyor 12 to travel at a constant speed.

Continuous reinforcing fiber strands 22 are pulled out from the bobbins 21, continuously cut to a predetermined length by the cutting machine 23, then allowed to collide against the distributing machine (distributor) 24 to form discontinuous reinforcing fibers containing a plurality of discontinuous reinforcing fiber aggregates, and scattered on the first resin sheet 14. As a result, discontinuous reinforcing fibers containing discontinuous reinforcing fiber aggregates are scattered randomly on the traveling first resin sheet 14 so that the aggregates 31 are formed continuously.

Then, at a position downstream of the point where the aggregate 31 is formed continuously, the second carrier sheet is pulled out from the second sheet roll 15 while paste of the matrix resin is supplied from the second resin bath 16 and spread to a predetermined thickness over the surface of the second carrier sheet to form the second resin sheet 17. The second resin sheet 17 is carried by the conveyor 12 to travel at a constant speed and the second resin sheet 17 is joined to form a layered structure in which its surface coated with paste of the matrix resin is in contact with the top face of the aggregate 31. In this layered structure forming process, the interior of the aggregate 31, in which discontinuous reinforcing fibers containing discontinuous reinforcing fiber aggregates are scattered randomly, is impregnated partly with the matrix resin spread over the first resin sheet 14 and the second resin sheet 17 to form the aggregate 32 continuously.

Then, a pressure is applied to either or both of the surfaces of the aggregate 32 in the compression mechanism 33 to allow the discontinuous reinforcing fibers to be impregnated with the matrix resin (impregnation step) so that the molding material 34, which is designed to work as precursor for a discontinuous fiber reinforced composite material, is formed between the first carrier sheet and the second carrier sheet. The molding compound 34 is, for example, wound up together with the first carrier sheet 14 and the second carrier sheet 17 to form a roll.

The cutting machine 23 is not particularly limited unless it impairs the desired object and, for example, a guillotine blade type or a disk blade type one may be used. As illustrated in FIG. 4, a disk blade type machine has a cutter roller 41 equipped with protruding disk blades 42 arranged at appropriate intervals on the roller surface 40, a nip roller 50 with a flat surface that is located near or in contact with the cutter roller and stands in substantially parallel to the rotation axis direction of the cutter roller, and the traverse guide 51 that moves to and fro in the traverse direction to guide the reinforcing fiber strand 22 while the reinforcing fiber strand 22 is fed to the cutter roller 41. To fill the role of a cutting board for the cutter roller 41, the nip roller 50 preferably has a roller surface made of an elastic material such as rubber and urethane resin.

When using a disk blade type machine for producing a bow-shaped discontinuous reinforcing fiber aggregate (A), where, for example, the traverse guide 51 moves from right to left and returns in the opposite direction to guide the reinforcing fiber strand 22 to and fro, it is preferable that the intervals of the disk blades 42 protruding from the cutter roller surface 40 be smaller, at least in the circumferential part that receive the reinforcing fiber strand 22, than the width of the reinforcing fiber strand sent to the cutter roller. It is more preferable that the ratio of the interval between the disk blades 42 protruding from the cutter roller surface to the width of the reinforcing fiber strand be 0.1:1.0 to 0.9:1.0. In another preferable example, the traverse guide that guides the reinforcing fiber strand to and fro in the traverse direction preferably returns in the right to left direction or in the opposite direction with an acceleration rate of 1 G (gravity acceleration) or more.

EXAMPLES

Next, details of the Examples and Comparative Examples are described.

First, the methods used to measure characteristics in the Examples and Comparative Examples are described.

(1) Measurement of Length-Directional Size of Minimum Circumscribed Rectangle of Bow-Shaped Discontinuous Reinforcing Fiber Aggregate A sample having a size of 150 mm×150 mm was cut out of a discontinuous fiber reinforced composite material or a molding material, i.e., a precursor, and the sample cut out was heated for about 1 to 2 hours in an electric furnace maintained at 500° C. to 600° C. to burn off the organic components such as matrix resin to extract a discontinuous reinforcing fiber sheet from the sample. Discontinuous reinforcing fibers, all in the form of aggregates, were removed from the discontinuous reinforcing fiber sheet using tweezers or the like so carefully that they would maintain their shapes. At this time, those discontinuous reinforcing fibers that were involved in the cut surface formed when cutting out the sample having a size of 150 mm×150 mm were excluded from observation. The extracted discontinuous reinforcing fiber aggregates were placed on a flat table and projected onto a two-dimensional plane using a camera or the like, and the minimum circumscribed rectangles were determined from the shapes observed, followed by recording the long side length L and the short side length W of each minimum circumscribed rectangle.

The discontinuous reinforcing fiber aggregates each giving a minimum circumscribed rectangle with a short side length W of less than 0.5 mm were categorized as discontinuous reinforcing fiber aggregates (3), which were in the state of being opened to the filament level. The discontinuous reinforcing fiber aggregates each giving a minimum circumscribed rectangle with a short side length W 0.5 mm or more were divided into the following two groups: discontinuous reinforcing fiber aggregates with a long side length L of 30 mm or more, which were categorized as discontinuous reinforcing fiber aggregates (1), and discontinuous reinforcing fiber aggregates with a long side length L of less than 30 mm, which were categorized as discontinuous reinforcing fiber aggregates (2).

When a discontinuous reinforcing fiber sheet cannot be removed successfully from a discontinuous fiber reinforced composite material, measurements may be taken in the same way from a discontinuous reinforcing fiber sheet that has not been impregnated with the matrix resin.

(2) Measurement of Weight Ratio Among Discontinuous Reinforcing Fiber Aggregates (1) to (3)

Using a balance capable of measuring down to 1/10,000 g, the weights of all the discontinuous reinforcing fiber aggregates (1), the discontinuous reinforcing fiber aggregates (2), and the discontinuous reinforcing fiber aggregates (3) were measured. Then, the weight ratio Wa of the discontinuous reinforcing fiber aggregates (1) to the total weight of the discontinuous reinforcing fibers, the weight ratio Wb of the discontinuous reinforcing fiber aggregates (2) thereto, and the weight ratio Wc of the discontinuous reinforcing fiber aggregates (3) thereto were calculated by the following formulae:

$$Wa = W1/(W1+W2+W3) \times 100(\%)$$

$$Wb = W2/(W1+W2+W3) \times 100(\%)$$

$$Wc = W3/(W1+W2+W3) \times 100(\%)$$

W1: total weight of discontinuous reinforcing fiber aggregates (1)
W2: total weight of discontinuous reinforcing fiber aggregates (2)
W3: total weight of discontinuous reinforcing fiber aggregates (3).

(3) Measurement Method for Number Average of Apex Angle θ of Discontinuous Reinforcing Fiber Aggregates Each of the discontinuous reinforcing fiber aggregates (1) and the discontinuous reinforcing fiber aggregates (2) was individually projected onto a two-dimensional plane using a digital microscope (manufactured by Keyence). As illustrated in FIG. 5, a circle with a radius of 2 mm was drawn with the center at one length-directional end with an acute angle of the discontinuous reinforcing fiber aggregate and the angle between the lines connecting this acute angle apex end and the intersections between the circle and two sides were measured. It was designated as the apex angle θ1 at an end of the discontinuous reinforcing fiber aggregate, and the angle of the opposite apex was measured in the same way. The average of the two apex angles (θ1, θ2) was calculated and adopted as the apex angle θi of that individual discontinuous reinforcing fiber aggregate. It is noted that when an apex is damaged in shape so largely that its angle is difficult to measure, only the other apex angle may be adopted. If both apex angles are difficult to measure, they are excluded from observation.

From the individual apex angle θi determined above, the number average of apex angle θ is calculated by the formula given below:

$$\text{Number average of apex angle } \theta = \Sigma \theta i/n$$

θi: apex angle of each of discontinuous reinforcing fiber aggregates (1) and (2)
n: number of fiber aggregates each having actually measured apex angle among discontinuous reinforcing fiber aggregates (1) and (2).

(4) Measurement Method for Weight Ratio and Number Average of Obtuse Angle α of Bow-Shaped Discontinuous Reinforcing Fiber Aggregates (A)

From the discontinuous reinforcing fiber aggregates (1) and the discontinuous reinforcing fiber aggregates (2), all the bundles that can be regarded visually as bow-shaped discontinuous reinforcing fiber aggregates (A) as illustrated in FIGS. 2(1)-(7) were extracted. The weights of all these bow-shaped discontinuous reinforcing fiber aggregates (A) were measured using a balance capable of measuring down to 1/10,000 g, and the weight ratio Wy of the bow-shaped discontinuous reinforcing fiber aggregates (A) was calculated by the formula given below.

"Yes" was entered in the record if at least one bow-shaped discontinuous reinforcing fiber aggregate (A) was found to be included in the discontinuous reinforcing fiber aggregates (1), whereas "No" was entered if no such aggregate was identified.

$$Wy = W4/(W1+W2+W3) \times 100(\%)$$

W4: total weight of bow-shaped discontinuous reinforcing fiber aggregates (A) included in discontinuous reinforcing fiber aggregates (1) and discontinuous reinforcing fiber aggregates (2)

Each of the bow-shaped discontinuous reinforcing fiber aggregates (A) was individually projected onto a two-dimensional plane using a digital microscope (manufactured by Keyence) as illustrated in FIG. 6. A circle with a radius of 0.5 mm was drawn with the center at an obtuse angle apex of the region where the number of filaments started to decrease, and the angle between the lines connecting this obtuse angle apex and the intersections between the circle and two sides was measured. It was designated as the obtuse angle α1 at an obtuse apex of the bow-shaped discontinuous reinforcing fiber aggregate (A), and if there was another obtuse angle at the opposite position, it was measured in the same way as above. If there was only one obtuse angle, that angle was adopted, whereas if there were two obtuse angles, the average of the two obtuse angles was adopted as the obtuse apex angle α$i$ of this individual bow-shaped discontinuous reinforcing fiber aggregate (A). However, when the region where the number of filaments started to decrease has an indistinct obtuse angle shape, the tangents to the two sides are drawn and extended and the intersection between the extended tangents and the angle formed between the extended tangents may be adopted as the obtuse apex and the obtuse angle, respectively. If measurement is difficult due to a significantly damaged edge shape or the like, the only one angle may be adopted, whereas if the edge shape is significantly damaged at both apexes, they are excluded from observation.

From the individual obtuse apex angle α$i$ determined above, the number average of obtuse apex angle α is calculated by the formula given below:

$$\text{Number average of obtuse angle } \alpha = \Sigma \alpha i / m$$

α$i$: obtuse angle of each bow-shaped discontinuous reinforcing fiber aggregate (A)

m: number of fiber aggregates each having an actually measured obtuse angle among bow-shape discontinuous reinforcing fiber aggregates (A).

(5) Measurement Method for Number Average of Fiber Length l of Discontinuous Reinforcing Fiber Aggregates (2)

Each of the discontinuous reinforcing fiber aggregates (2) was individually projected onto a two-dimensional plane using a digital microscope (manufactured by Keyence Co., Ltd.), and two parallel edge sides in the fiber orientation direction in each discontinuous reinforcing fiber aggregate was measured to the nearest 0.1 mm. The average was adopted as the fiber length l$i$ of the individual discontinuous reinforcing fiber aggregate (2). However, when an edge side is damaged in shape so largely that its length is difficult to measure, only one edge side may be adopted, whereas if both are significantly damaged, they are excluded from observation.

From the individual fiber length l$i$ determined above, the number average of fiber length l is calculated by the formula given below:

$$\text{Number average of fiber length } l = \Sigma li/p$$

l$i$: fiber length of individual discontinuous reinforcing fiber aggregate (2)

p: number of fiber aggregates each having actually measured fiber length among the discontinuous reinforcing fiber aggregates and (2).

(6) Wf (Content of Discontinuous Reinforcing Fibers)

A sample having a size of 150 mm×150 mm was cut out of a fiber reinforced composite material and the weight thereof was measured. Then, the sample was heated for about 1 to 2 hours in an electric furnace maintained at 500° C. to 600° C. to burn off the organic components such as matrix resin and cooled to room temperature, followed by measuring the weight of the remaining discontinuous reinforcing fibers. The ratio of the weight of the discontinuous reinforcing fibers to the weight of the sample before burning off the organic components such as matrix resin was determined and adopted as the content of the discontinuous reinforcing fibers.

(7) Bending Strength and Flexural Modulus

Bending strength was measured according to JIS-K7171: 2016. For the bending strength, the CV value (coefficient of variation [%]) in bending strength was also calculated. A sample with a CV value of 10% or less was judged to have a small variation (OK) and one with a CV value of more than 10% was judged to have a large variation (NG). In the bending test, furthermore, measurements were taken in a randomly selected direction (0° direction) and in the direction at 90° to the 0° direction in a two-dimensional plane, and if the ratio of the average for the 0° direction to the average for the 90° direction is 1.2 to 0.83, it is judged to be isotropic (OK), whereas in other instances, it is judged to be anisotropic (NG).

Reinforcing Fiber and Matrix Resin

The reinforcing fibers and matrix resins used in the Examples and Comparative Examples are listed below.

Reinforcing Fiber Strand (1):

A continuous carbon fiber strand having a fiber diameter of 7 μm, a tensile elastic modulus of 230 GPa, a filament number of 12,000, and a strand width of 6 mm was used.

Reinforcing Fiber Strand (2):

A continuous carbon fiber strand having a fiber diameter of 7.2 μm, a tensile elastic modulus of 242 GPa, a filament number of 50,000, and a strand width of 10 mm was used.

Matrix Resin (1):

The resin used was a mixture of 100 parts by mass of vinyl ester resin (VE resin) (Derakane 790, manufactured by The Dow Chemical Company), 1 part by mass of tertbutylperoxybenzoate (Perbutyl Z, manufactured by NOF Corporation), 2 parts by mass of zinc stearate (SZ-2000, manufactured by Sakai Chemical Industry Co., Ltd.), and 4 parts by mass of magnesium oxide (MgO #40, manufactured by Kyowa Chemical Industry Co., Ltd.).

Example 1

An SMC sheet, which serves as a precursor for a discontinuous fiber reinforced composite material, was prepared using an apparatus as shown in FIG. 3. A first carrier sheet made of polypropylene was pulled out from the first raw material roll (first sheet roll) and supplied to the first conveyor, and paste of a matrix resin was spread to a predetermined thickness by a doctor blade to form the first resin sheet.

The reinforcing fiber strand (1) was pulled out at a constant speed and cut by a disk blade type cutting machine that had a traverse guide designed to guide the reinforcing fiber strand to and fro in the traverse direction, a cutter roller equipped with disk blades protruding at appropriate intervals from the roller surface, and a nip roller located in contact with the cutter roller and in substantially parallel to the rotation axis direction of the cutter roller, wherein cutting was performed continuously such that the reinforcing fiber strand (1) was maintained at a predetermined length without slack. It was then allowed to collide against a distributing machine (distributor) and disperse to continuously form a sheet of discontinuous reinforcing fibers in which discontinuous reinforcing fibers containing a plurality of discontinuous reinforcing fiber aggregates were randomly oriented, which was then dropped onto the first resin sheet. In this step, the ratio between the pulling speed and the traverse speed was 3.7:1.0; the shuttling distance of the traverse guide was 100 mm; the ratio of the interval between the disk blades to the width of the reinforcing fiber strand (1) was 0.4:1.0; and the rotation speed of the distributor was 400 rpm.

Subsequently, the second carrier sheet made of polypropylene was pulled out from the second raw material roll (second sheet roll) and supplied to the second conveyor, and paste of the matrix resin was spread to a predetermined thickness by a doctor blade to form the second resin sheet.

The first resin sheet containing discontinuous reinforcing fiber aggregates was combined with the second resin sheet together with the second carrier sheet, and pressure was applied to both surfaces so that the sheet containing discontinuous reinforcing fiber aggregates was impregnated with the matrix resin to prepared an SMC sheet, i.e., a precursor for a discontinuous fiber reinforced composite material. As for the resulting SMC sheet, there were no flows of the SMC sheet occurring in the width direction, which is perpendicular to the conveyance direction, in the impregnation step, making it possible to produce an SMC sheet having a desired width. Then, the SMC sheet thus prepared was cured at a temperature of 25±5° C. for one week starting immediately after its production and subjected to various evaluations.

The resulting SMC sheet was cut to a predetermined size, and the upper and lower carrier sheets were removed, followed by burning off the organic components such as matrix resin. The Wf was measured to be 55 wt %, and when the remaining discontinuous reinforcing fibers were subjected to various evaluations, results showed that bow-shaped discontinuous reinforcing fiber aggregates accounted for 6 wt % of the discontinuous reinforcing fibers. Results of evaluations are given in Table 1.

Next, pieces with a size of 265×265 mm were cut out of the SMC sheet, and three of them were stacked with their conveyance directions (MD directions) in the SMC production machine aligned in the same direction, and placed in the central portion of a flat plate type mold having a cavity of 300×300 mm (charge rate about 80%). Then, the resin was cured at about 140° C. for 5 minutes under a pressure of 10 MPa in a heating type press molding machine, thereby producing a flat plate-like molded product with a size of 300×300 mm×3 mm.

The resulting molded product was cut and subjected to bending strength and flexural modulus measurement, and results showed that the molded product had a bending strength of 450 MPa and a flexural modulus of 33 GPa, with a CV value of 10% or less, proving that the molded product was low in variation and high in isotropy. Results of evaluations are given in Table 1.

Example 2

Except that, when producing an SMC sheet intended as a precursor for a composite material, the traverse guide had a shuttling distance of 160 mm, the same procedure as in Example 1 was carried out to produce a molded product and make evaluations. Results are given in Table 1.

Example 3

Except that, when producing an SMC sheet intended as a precursor for a composite material, the reinforcing fiber strand (2) was used, that the traverse guide had a shuttling distance of 160 mm, and that the ratio of the interval between the disk blades to the width of the reinforcing fiber strand (2) was 0.24:1.0, the same procedure as in Example 1 was carried out to produce a molded product and make evaluations. Results are given in Table 1.

Example 4

The reinforcing fiber strand (2) was unwound by a winder at a constant speed, and the unwound reinforcing fiber strand (2) was passed between vibration type widening rollers vibrating axially at 10 Hz to widen the reinforcing fiber bundles and then it was passed between width-regulating rollers with a regulated width of 50 mm, thereby providing a widened reinforcing fiber strand (2) with an increased width of 50 mm. Next, a fiber separating tool having fiber-separating steel plates each having a protruding shape with a thickness of 0.3 mm, width of 3 mm, and height of 20 mm were arranged at equal intervals of 3 mm in the width direction of a widened reinforcing fiber strand (2) was stuck and removed intermittently, and then the strand was passed between width-regulating rollers with a regulated width of 10 mm, thereby preparing a partly separated reinforcing fiber strand (2) with a regulated width of 10 mm.

Except that, when producing an SMC sheet intended as a precursor for a fiber reinforced composite material, the resulting partly separated reinforcing fiber strand (2) was used, that the traverse guide had a shuttling distance of 160 mm, and that the ratio of the interval between the disk blades to the width of the partly separated reinforcing fiber strand (2) was 0.24:1.0, the same procedure as in Example 1 was carried out to produce a molded product and make evaluations. Results are given in Table 1.

Example 5

Except that, when producing an SMC sheet, the carrier sheet unwinding rate and the clearance between the doctor blade and the carrier sheet were adjusted to produce an SMC sheet intended as a precursor for a fiber reinforced composite material that would give an Wf of 45 wt % after burning off the organic components such as matrix resin, the same procedure as in Example 4 was carried out to produce a molded product and make evaluations. Results are given in Table 1.

Comparative Example 1

A first guillotine type cutting machine having a blade set diagonally to the strand conveyance direction so that the minimum circumscribed rectangle would have a length of 60 mm and the apex cutting angle would be 15° was used, together with a second guillotine type cutting machine having a blade set diagonally to the strand conveyance direction so that the minimum circumscribed rectangle would have a length of 20 mm and the apex cutting angle would be 15°, and a reinforcing fiber strand (2) was conveyed such that the ratio between the speed for conveying the reinforcing fiber strand (2) to the first guillotine type cutting machine and that to the second guillotine type cutting machine was 12:88. The reinforcing fiber strand (2) was cut continuously by each guillotine type cutting machine to a predetermined length without slack, and then, it was allowed to collide against a distributing machine (distributor) and disperse to continuously form a sheet of discontinuous reinforcing fibers in which discontinuous reinforcing fibers containing a plurality of discontinuous reinforcing fiber aggregates were randomly oriented, thus producing an SMC sheet intended as a precursor for a composite material. Except for this, the same procedure as in Example 3 was carried out to produce a molded product and make evaluations. Results are given in Table 2.

The resulting molded product was inferior in bending strength and flexural modulus and, particularly because it did not contain bow-shaped discontinuous reinforcing fiber aggregates, structural defects were more likely to occur in portions where discontinuous reinforcing fiber bundles overlapped each other. As a result, the molded product had a large variation with a CV value of more than 10%.

Comparative Example 2

Only the second guillotine type cutting machine having a blade set diagonally to the strand conveyance direction so that the minimum circumscribed rectangle would have a length of 20 mm and the apex cutting angle would be 15° was used, and the reinforcing fiber strand (2) was cut continuously by the guillotine type cutting machine to a predetermined length without slack. Then, it was allowed to collide against a distributing machine (distributor) and disperse to continuously form a sheet of discontinuous reinforcing fibers in which discontinuous reinforcing fibers containing a plurality of discontinuous reinforcing fiber aggregates were randomly oriented, thus producing an SMC sheet intended as a precursor for a composite material. Except for this, the same procedure as in Example 3 was carried out to produce a molded product and make evaluations. Results are given in Table 2.

This SMC sheet flowed in the width direction, which is perpendicular to the conveyance direction, in the impregnation step. Accordingly, the resulting SMC sheet had a width larger than specified.

The molded product was inferior in bending strength and flexural modulus. In particular, due to the flowing of the SMC sheet in the width direction in the impregnation step, the ratio of the average for the 0° direction to the average for the 90° direction was outside of 1.2 to 0.83, resulting in a molded product with anisotropy.

TABLE 1

| Example | | | 1 | 2 | 3 | 4 | 5 |
|---|---|---|---|---|---|---|---|
| reinforcing fiber | | | carbon fiber (1) | carbon fiber (1) | carbon fiber (2) | carbon fiber (2) | carbon fiber (2) |
| matrix resin | | | matrix resin (1) | matrix resin (1) | matrix resin (1) | matrix resin (1) | matrix resin (1) |
| discontinuous reinforcing fiber Wf | | wt % | 55 | 55 | 55 | 55 | 45 |
| bow-shaped discontinuous reinforcing fiber aggregate (A) | Wy ratio | wt % | 6 | 3 | 4 | 3 | 3 |
| | obtuse angle α | ° | 165 | 163 | 160 | 163 | 163 |
| discontinuous reinforcing fiber aggregate (1) | Wa ratio | wt % | 12 | 7 | 8 | 6 | 6 |
| | existence of bow-shaped discontinuous reinforcing fiber aggregate (A) | — | Yes | Yes | Yes | Yes | Yes |
| | apex angle θ | ° | 11 | 11 | 11 | 10 | 10 |
| | length L of minimum circumscribed rectangle | mm | 58 | 55 | 50 | 52 | 52 |
| discontinuous reinforcing fiber aggregate (2) | Wb ratio | wt % | 88 | 93 | 92 | 94 | 94 |
| | apex angle θ | ° | 15 | 15 | 14 | 14 | 14 |
| | length L of minimum circumscribed rectangle | mm | 20 | 20 | 21 | 19 | 19 |
| | fiber length l | mm | 12 | 12 | 12 | 12 | 12 |
| discontinuous reinforcing fiber aggregate (3) | Wc ratio | wt % | 0 | 0 | 0 | 0 | 0 |
| bending strength | | MPa | 450 | 470 | 420 | 490 | 400 |
| bending elastic modulus | | GPa | 33 | 34 | 32 | 35 | 26 |
| variation, CV | | — | OK | OK | OK | OK | OK |
| isotropy/anisotropy | | — | OK | OK | OK | OK | OK |

TABLE 2

| Comparative Example | | | 1 | 2 |
|---|---|---|---|---|
| reinforcing fiber | | | carbon fiber (2) | carbon fiber (2) |
| matrix resin | | | matrix resin (1) | matrix resin (1) |
| discontinuous reinforcing fiber Wf | | wt % | 55 | 55 |
| bow-shaped discontinuous reinforcing fiber aggregate (A) | Wy ratio | wt % | 0 | 0 |
| | obtuse angle α | ° | — | — |
| discontinuous reinforcing fiber aggregate (1) | Wa ratio | wt % | 12 | 0 |
| | existence of bow-shaped discontinuous reinforcing fiber aggregate (A) | — | No | No |
| | apex angle θ | ° | 15 | — |
| | length L of minimum circumscribed rectangle | mm | 60 | — |

TABLE 2-continued

| | | | Comparative Example 1<br>carbon fiber (2)<br>matrix resin (1) | 2<br>carbon fiber (2)<br>matrix resin (1) |
|---|---|---|---|---|
| | | reinforcing fiber | | |
| | | matrix resin | | |
| discontinuous reinforcing fiber aggregate (2) | Wb ratio | wt % | 88 | 100 |
| | apex angle θ | ° | 15 | 15 |
| | length L of minimum circumscribed rectangle | mm | 20 | 20 |
| | fiber length l | mm | 12 | 12 |
| discontinuous reinforcing fiber aggregate (3) | Wc ratio | wt % | 0 | 0 |
| | bending strength | MPa | 390 | 400 |
| | bending elastic modulus | GPa | 31 | 32 |
| | variation, CV | — | NG | NG |
| | isotropy/anisotropy | — | OK | NG |

INDUSTRIAL APPLICABILITY

The fiber reinforced composite material can achieve both high fluidity during molding and good mechanical properties at a high level, which cannot be achieved by the conventional fiber reinforced composite materials composed mainly of discontinuous reinforcing fibers and a matrix resin. Flows of the discontinuous reinforcing fibers caused by flowing resin during the impregnation of a sheet-like molding material with a matrix resin under pressure can be prevented from occurring in the production process for a sheet-like molding material such as SMC sheet and stampable sheet, which serve as precursors for the composite material.

The invention claimed is:

1. A fiber reinforced composite material comprising discontinuous reinforcing fibers accounting for 20 wt % or more and less than 70 wt % and a matrix resin,
   wherein at least part of the discontinuous reinforcing fibers form fiber aggregates, and
   at least one of the fiber aggregates is such that when a face thereof is projected onto a two-dimensional plane, and each of two length-directional end portions of a minimum circumscribed rectangle about a projected face and a portion other than the two length-directional end portions contain at least one region in which the number of filaments belonging to the fiber aggregate decreases and is defined as a bow-shaped discontinuous reinforcing fiber aggregate (A);
   wherein 2 wt % or more and 15 wt % or less of all discontinuous reinforcing fibers form discontinuous reinforcing fiber aggregates (1) having a minimum circumscribed rectangle long side length of 30 mm or more, said aggregates being substantially uniformly distributed throughout the composite, and wherein said aggregates have a number average acute angle at both ends of 5°-30°.

2. The fiber reinforced composite material as set forth in claim 1, wherein at least one of the discontinuous reinforcing fiber aggregates (1) is a bow-shaped discontinuous reinforcing fiber aggregate (A).

3. The fiber reinforced composite material as set forth in claim 1, wherein a ratio of a number average of the long side length of minimum circumscribed rectangle: a number average of fiber length in the discontinuous reinforcing fiber aggregates (2) is 1.5:1.0 to 2.0:1.0, where a discontinuous reinforcing fiber aggregate (2) is the fiber aggregates that results in a minimum circumscribed rectangle having a long side length of less than 30 mm.

4. The fiber reinforced composite material as set forth in claim 3, wherein the discontinuous reinforcing fiber aggregates (2) are such that, when a face of each of them is projected onto a two-dimensional plane, the number average of the acute angle located at the length-directional end and measured to the length direction of the projected face is 5° or more and 30° or less.

5. The fiber reinforced composite material as set forth in claim 1, wherein the discontinuous reinforcing fiber aggregates (1) are such that, when a face of each of them is projected onto a two-dimensional plane, a number average of the acute angle located at the length-directional end and measured to the length direction of the projected face is 5° or more and 30° or less.

6. The fiber reinforced composite material as set forth in claim 1, wherein a number average of an obtuse angle between the length direction of the minimum circumscribed rectangle of the projected face of each bow-shaped discontinuous reinforcing fiber aggregate (A) and gradients of a region that are located outside the length-directional end portions and in which the number of filaments decreases is 135° or more and 175° or less.

7. The fiber reinforced composite material as set forth in claim 1, wherein the discontinuous reinforcing fibers have a number average of fiber length of 3 mm or more and less than 100 mm.

8. A fiber reinforced composite material comprising discontinuous reinforcing fibers accounting for 20 wt % or more and less than 70 wt % and a matrix resin,
   wherein at least part of the discontinuous reinforcing fibers form fiber aggregates, and
   at least one of the fiber aggregates is such that when a face thereof is projected onto a two-dimensional plane, and each of two length-directional end portions of a minimum circumscribed rectangle about a projected face and a portion other than the two length-directional end portions contain at least one region in which the number of filaments belonging to the fiber aggregate decreases and is defined as a bow-shaped discontinuous reinforcing fiber aggregate (A);
   wherein a number average of an obtuse angle between the length direction of the minimum circumscribed rectangle of the projected face of each bow-shaped discontinuous reinforcing fiber aggregate (A) and gradients of a region that are located outside the length-directional end portions and in which the number of filaments decreases is 135° or more and 175° or less.

* * * * *